United States Patent Office 3,024,776
Patented Mar. 13, 1962

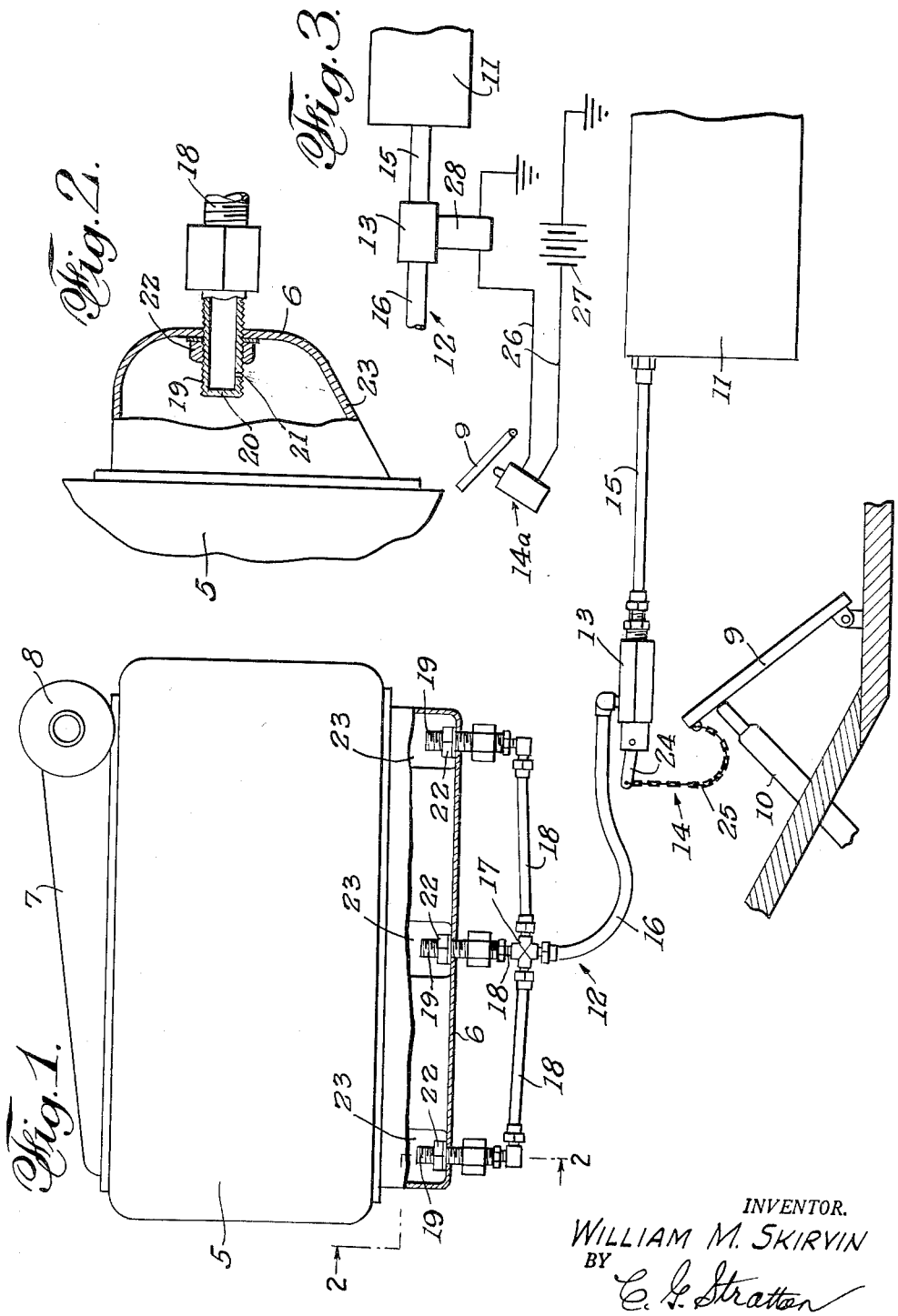
March 13, 1962
W. M. SKIRVIN
MEANS TO FEED SUPPLEMENTARY AIR TO
INTERNAL COMBUSTION ENGINES
Filed May 15, 1961
3,024,776
INVENTOR.
WILLIAM M. SKIRVIN
BY
C. G. Stratton
ATTORNEY

3,024,776
MEANS TO FEED SUPPLEMENTARY AIR TO INTERNAL COMBUSTION ENGINES
William M. Skirvin, 14540 Flomar Drive, Whittier, Calif.
Filed May 15, 1961, Ser. No. 110,247
6 Claims. (Cl. 123—119)

This invention relates to means to feed supplemental pressure air to the intake manifold of internal combustion engines, particularly diesel engines.

Additional or supplementary air for diesel engines is ordinarily provided through the use of a super charger, frequently involving expensive installations and including supplementary compressors. Such means is quite expensive, space-occupying equipment. An object of the present invention is to simplify the means for supplying an engine with a supplementary charge of compressed air at high engine speeds, i.e., at high road speeds and when hill-climbing, and when other required power is necessary, to, thereby, improve engine power, mileage-fuel ratio, reduce exhaust smoking and discharge of noxious gasses, and, generally, perform in an inexpensive manner.

Another object of the invention is to provide novel, simplified and improved means for utilizing the compressed air that is stored in an accumulator for operating the air brakes of an automotive vehicle, for providing a supplemental air feed to the intake manifold of the engine of said vehicle, said means operating only to effect such feed when the engine has reached a pre-determined r.p.m.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a schematic view showing the present air-feeding means in operative association with the intake manifold of a diesel engine.

FIG. 2 is an enlarged vertical sectional view as taken on the line 2—2 of FIG. 1.

FIG. 3 shows a modified control means for the feeding means.

The drawing, in plan, shows a diesel engine 5 with the usual intake manifold 6, exhaust manifold 7, and exhaust muffler 8. This engine, per se, forms no part of the present invention and is intended only as typical of an internal engine that, in its intake manifold, is fed with a supplemental charge of compressed air in addition to the air charge contained in the fuel being fed to the engine in the usual way.

A typical foot throttle 9 is shown as operating, when the same is depressed, control means 10 that opens and closes the throttle valve of the engine or whatever means is used to control fuel ingress to the engine. Any appreciable movement of the throttle 9 will cause fuel feed, the rate of feed increasing, in the usual way, as the throttle is further depressed.

A compressed air tank or accumulator 11, that is provided for supplying compressed air for the brakes of an automotive vehicle, particularly trucks, is shown in FIGS. 1 and 3. The conventional means for compressing and feeding said tank is not shown, nor the means that releases compressed air to the brakes.

According to the present invention, a system of pipes 12, connecting said tank 11 with the intake manifold 6, is provided to feed compressed air to said manifold, a normally-closed valve 13 is provided in said system of pipes to shut off such feed, and lost-motion or delayed-action means 14 interconnects the throttle and the valve 13 to cause said valve to open only when the engine speed has reached a pre-determined rate, for example, fifteen hundred revolutions per minute.

The system of pipes 12 is shown as a pipe or tube 15 that extends from the tank 11 and sends compressed air to the normally-closed valve 13. A pipe or tube 16 connects the outlet of said valve 13 with one leg of a cross fitting 17. The other three fitting legs are connected by pipes 18 to feed hollow fittings 19 that extend into the manifold 6. Said latter fittings terminate in blind or closed nipples 20 that reside in the manifold and adjacent to which a small jet orifice 21 is formed in each fitting 19. A nut and suitable sealing washer 22 is used to fixedly connect each fitting 19 to the manifold with the orifices thereof directed downwardly, as in FIG. 2, to cause compressed air emissions to be directed toward scoop walls 23 ordinarily provided in the manifold.

It will be clear that, when the valve 13 is open, a fine jet or stream of compressed air from tank 11 is directed by the scoop walls 23 to mingle with the intake charges of fuel and, thereby, fed to the engine cylinders for combustion therein. The number of fittings may vary. In this case, three are shown to feed auxiliary air to a six cylinder engine—one fitting for each two engine cylinders.

Ordinary operation, at part throttle, will not cause valve 13 to open due to the means 14. In the form of FIG. 1, an actuating lever 24 on the valve 13 is connected by a slack chain or cable 25 to the throttle 9 or to any means that moves when the throttle is depressed. When the slack is taken up and the throttle moved toward a full-open position, the chain or cable, by actuating lever 24, opens valve 13 releasing the compressed air in the tank for flow into the manifold 6. The amount of such air is increased as the valve 13 is opened more fully, upon continued depression of the throttle. Thus, the means 14 serves as a controller for the air feed.

In the modification of FIG. 3, the delayed action means, here designated 14a, is shown as a switch in an electric circuit 26 that is powered by the vehicle battery 27 and connected to a solenoid 28 that controls the valve 13. Said switch 14a is actuated only when the throttle 9 approaches full-throttle position providing a mode of operation substantially similar to the valve controlling means 14.

It is a simple matter to provide for an air feed at a desired engine speed, fifteen hundred revolutions per minute being exemplary and, if it is necessary to insure an adequate supply of air in the accumulator tank 11, the cut-in switch of the air compressor for the tank may be set up, accordingly.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. In combination, the engine of an automotive vehicle having air brakes, said engine having an intake manifold with a throttle controlling fuel intake to the engine through said manifold, a compressed air accumulator tank for supplying air for said brakes, a piping system extending from said tank to the intake manifold, and means controlled by the throttle to control flow in the piping system.

2. In combination, the engine of an automotive vehicle having air brakes, said engine having an intake manifold with a throttle controlling fuel intake to the engine through said manifold, a compressed air accumulator tank for supplying air for said brakes, a piping system extending from said tank to the intake manifold, a normally-closed valve controlling flow in said piping system, and means operated by the throttle to open said valve.

3. In combination, the engine of an automotive vehicle having air brakes, said engine having an intake manifold with a throttle controlling fuel intake to the engine through said manifold, a compressed air accumulator tank for supplying air for said brakes, a piping system extending from said tank to the intake manifold, a normally-closed valve controlling flow in said piping system, and a normally slack connection between the throttle and the valve to open the valve as full-throttle position of the throttle is approached.

4. In combination, the engine of an automotive vehicle having air brakes, said engine having an intake manifold with a throttle controlling fuel intake to the engine through said manifold, a compressed air accumulator tank for supplying air for said brakes, a piping system extending from said tank to the intake manifold, a normally-closed valve controlling flow in said piping system, and normally deenergized electric means to open said valve upon energization by movement of the throttle toward full-throttle position.

5. In a supplemental air feed for the intake manifold of an internal combustion engine, a hollow fitting extending into said manifold and connected to receive compressed air from outside the manifold, a closed inner end on said fitting and a jet orifice in the fitting to direct a stream of air in a direction toward the engine.

6. In a supplemental air feed for the intake manifold of an internal combustion engine, a hollow fitting extending into said manifold and connected to receive compressed air from outside the manifold, a closed inner end on said fitting and a jet orifice in the fitting to direct a stream of air in a direction toward the engine, and a throttle-controlled, accumulator-stored supply of air for said fitting.

References Cited in the file of this patent

UNITED STATES PATENTS

| | | |
|---|---|---|
| 1,164,930 | DeClairmont | Dec. 21, 1915 |
| 1,775,238 | Fellows | Sept. 9, 1930 |
| 2,884,954 | Roberts | May 5, 1959 |